United States Patent

Noland

[11] Patent Number: 5,827,954
[45] Date of Patent: Oct. 27, 1998

[54] CAMSHAFT DEGREEING PLATFORM

[76] Inventor: E. Bruce Noland, 205 Wildman St., N. E., Leesburg, Va. 22075

[21] Appl. No.: 856,507

[22] Filed: May 15, 1997

[51] Int. Cl.⁶ .................................................. G01M 15/00
[52] U.S. Cl. ......................... 73/116; 33/611; 33/DIG. 15
[58] Field of Search ................................ 73/116; 33/601, 33/611, DIG. 15

[56] References Cited

U.S. PATENT DOCUMENTS

| | | |
|---|---|---|
| 2,471,746 | 5/1949 | Hilbert . |
| 2,521,966 | 9/1950 | Clayborne . |
| 2,776,494 | 1/1957 | Sheppard . |
| 2,782,518 | 2/1957 | Tieman . |
| 2,851,782 | 9/1958 | Kollmann . |
| 4,580,446 | 4/1986 | Ansteth ..................................... 73/116 |
| 5,459,940 | 10/1995 | McKenzie . |

OTHER PUBLICATIONS

Article form Internet, "Mechanical Gaging" (no date available).
Article form Internet, "Camshaft Selection Guide" (no date available).
Article form Internet, "BAsic Camshaft Installation Techniques" (no date available).
Lunati Cams sales flyer, "Lifter Installation and Valve Adjustment for Hydraulic and Mechanical Lifter Camshafts" (no date available).
"How to Hot Rod Small–Block Chevys", 1976.
Article form Internet, "Camshaft Installation and Degreeing" (no date available).
Quadrant Scientific, "Camshaft Measurenment and Analysis Tool", Nov. 1996.
Camshaft Tech, "How To Avoid The Bumpstick Blues—Choosing The Right Cam", Apr. 1996.
Engine Tech, "How To Make It Work" (no date available).
Popular Hot Rodding, "Essential Perations—Cam Degreeing", Apr. 1997.

*Primary Examiner*—Ronald L. Biegel
*Assistant Examiner*—Eric S. McCall
*Attorney, Agent, or Firm*—Nixon & Vanderhye P.C.

[57] ABSTRACT

A measurement platform assembly for degreeing a camshaft of an internal combustion engine having at least one piston reciprocable within a cylinder formed in a block, an intake valve and an exhaust valve and respective intake lifter and exhaust lifter associated with the cylinder, the tool comprising a plate having plural holes sized and arranged to permit fastening of the plate to the engine block via bolt holes in the block; the plate mounting three gauges, one of which is adapted to engage the piston and two of which are adapted to engage respective substitute exhaust and inlet lifters, the gauges adapted to measure movement of the piston and substitute exhaust and inlet lifters as the camshaft rotates.

12 Claims, 5 Drawing Sheets

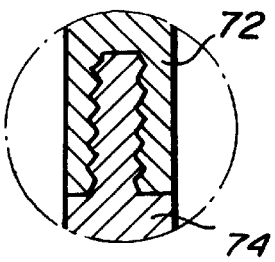
Fig. 4A
Fig. 3
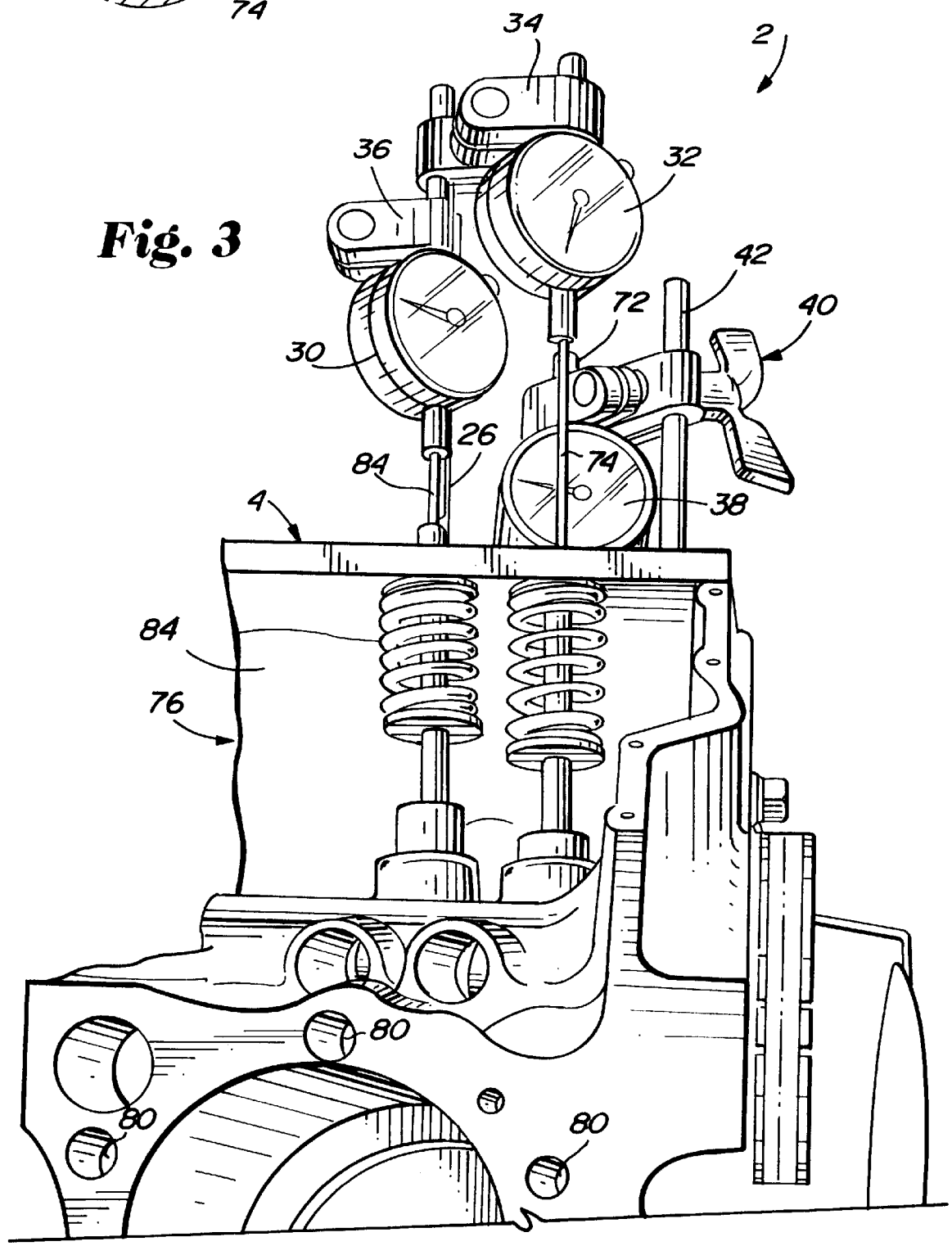

CAMSHAFT DEGREEING PLATFORM

This invention relates to a measurement platform device or tool for facilitating the degreeing of a camshaft.

BACKGROUND

In order to determine if a camshaft meets the manufacturer's specifications, a procedure known as camshaft "degreeing" is employed. The procedure determines if, in fact, the valves are opened and closed in the precise, specified manner. This is particularly important where competition engines are concerned, since cylinder pressures/volumes are critical to engine performance. Inaccurate camshafts can rob much needed horsepower from these engines, placing the driver at a real competitive disadvantage.

The problem arises because camshafts may not always meet manufacture specifications. In addition, cam timing can be negatively impacted by tolerance stacking, and/or manufacturer's decisions to target overall performance as a goal rather than racing performance.

As already indicated, cam degreeing procedures are known, and, in fact, there are different ways to degree a camshaft, all of which provide essentially the same information. See, for example, "Essential Operations—Cam Degreeing" by Doc Fromhader in the April 1997 edition of Popular Hot Rodding. See also "How To Hot rod Small-Block Chevy's" published by HP Books; Copyright 1976; Library of Congress #73-173702. The specific procedures are somewhat complex and need not be described here, except to note that they involve determining crank position, in degrees of rotation from top dead center (TDC), and relative to specific points on the cam shaft, e.g., the point where the cam starts to push the lifter up; where the lifter is at the lowest point of its travel; and the intake centerline. The procedure must be repeated for each lifter (intake and exhaust) for each piston. Currently, the most widely employed technique is to use a single magnetic indicator base holding a single dial indicator to record the various measurements. The base is first located on the engine block such that the dial indicator can be maneuvered into position where the indicator stem will measure the movement of a piston in the cylinder on either side of top dead center. Once top dead center (TDC) has been located, the cam degreeing procedure is commenced, moving the indicator base as necessary to record measurements for each lifter associated with each piston. It will be appreciated that the procedure is both tedious and time consuming. Moreover, the indicator base may move during measurement, or between measurements at a given location, thereby placing the accuracy of the readings into question. Thus, there remains a need for a simple, easy to use, and accurate cam degreeing device or tool which minimizes the number of adjustments and/or tool relocations.

SUMMARY OF THE INVENTION

In accordance with a first exemplary embodiment of this invention, a measurement platform tool is provided which may be temporarily secured in place within the lifter gallery and atop the engine deck of a partly assembled engine. More specifically, the platform is designed to be attached utilizing existing threaded head bolt holes already present in the engine block. Since the pattern of bolt holes is repeated in areas adjacent each cylinder, the measurement platform may be relocated to corresponding positions for each cylinder. For piston and lifter measurements at any one cylinder, however, the platform remains stationary.

The platform itself consists essentially of a relatively thick plate which may be manufactured from any of several suitable materials, with aluminum presently preferred. In addition to the three holes by which the platform is secured to the block, three additional holes are provided. One of these additional holes supports a vertical rod or standard to which a pair of dial indicators can be secured, utilizing conventional adjustable mounting hardware. The remaining two holes are sized and located to vertically align with a pair of lifter substitutes for the intake and exhaust valves associated with a respective cylinder. As explained in greater detail below, the lifter substitutes extend upwardly through the holes in the platform where they are engaged by stems of the first two dial indicators. A third dial indicator is supported on a second vertical standard welded to one of the bolts used to secure the platform to the block. This third dial indicator is used to determine TDC for the piston, and thus, the indicator stem is located to engage the top of the piston as it approaches its upward limit of movement and as it begins its downward movement.

A pair of lifter substitutes are provided which are inserted within the inlet and exhaust lifter bores. The lifter substitutes are spring loaded by a pair of coil springs interposed between the bottom of the platform and the lifter bores within the block. Small washer-like guides may be utilized to keep the springs centered on the lifter rods. The springs are sized to be under compression and to apply a downward force to the lifter substitute rods. This insures that when the cam lobes rotate to a position where the lifter rods would normally descend, the spring bias insures that they do in fact descend and do not have to be pushed downwardly manually to overcome the friction within the bore. The upper ends of the substitute lifter rods have small recesses which allow the dial indicator stems to be centered on the lifter rod substitutes.

With the above arrangement, lifter rod travel for both the inlet and the exhaust lifters as well as piston travel can be measured simultaneously without having to relocate the measurement platform for each.

A conventional degree wheel is required for use with this invention for the cam degreeing procedure, and is normally attached to the front of the crank shaft. A pointing device is also provided for attachment to the block in conventional fashion so that it can locate the degree marks on the degree wheel as the latter rotates. With this apparatus, which may be provided in kit form, cam degreeing procedures can be carried out in a quick, efficient and accurate manner heretofore not available in the prior art.

In an alternative embodiment of the invention, the mechanical dial indicators may be replaced with electronic sensors for use with an electronic degree wheel kit so that the various measurements can be displayed as digital readouts on a control panel.

In a still further advanced version of the invention, a micro-processor may be employed in conjunction with the control panel to measure and record all readings throughout the procedure. A printout may then be obtained which will display all of the readings and precisely pinpoint the cam degree. Alternatively, the operator could simply press a button on the control panel and the computer would post the accurate cam degree on the control panel or separate monitor screen.

Accordingly, in one aspect, the present invention relates to a measurement platform assembly for degreeing a camshaft of an internal combustion engine having at least one piston reciprocable within a cylinder formed in a block, an intake valve and an exhaust valve and respective intake lifter and exhaust lifter associated with the cylinder associated with the cylinder, the tool comprising a plate having plural holes sized and arranged to permit fastening of the plate to the engine block via bolt holes in the block; the plate having one or more standards secured thereto; and at least two dial gauges mounted on the one or more standards, one of the dial gauges adapted to engage the piston and the other of the dial gauges adapted to be positioned over one of the intake and exhaust lifters.

In another aspect, the invention relates to a measurement platform assembly for degreeing a camshaft of an internal combustion engine having at least one piston reciprocable within a cylinder formed in a block, an intake valve and an exhaust valve and respective intake lifter and exhaust lifter associated with the cylinder, the tool comprising a plate having plural holes sized and arranged to permit fastening of the plate to the engine block via bolt holes in the block; the plate mounting three gauges, one of which is adapted to engage the piston and two of which are adapted to engage respective substitute exhaust and inlet lifters, the gauges adapted to measure movement of the piston and substitute exhaust and inlet lifters as the camshaft rotates.

Other objects and advantages of the subject invention will become apparent from the detailed description which follows.

BRIEF DESCRIPTION OF THE DRAWINGS

FIG. 3 illustrates the cam degreeing platform of FIG. 1, taken from still another perspective taken from the left side of the block as viewed in FIG. 1;

FIG. 4A is an enlarged detail taken from FIG. 4; and

DETAILED DESCRIPTION OF THE DRAWINGS

Figure 1:
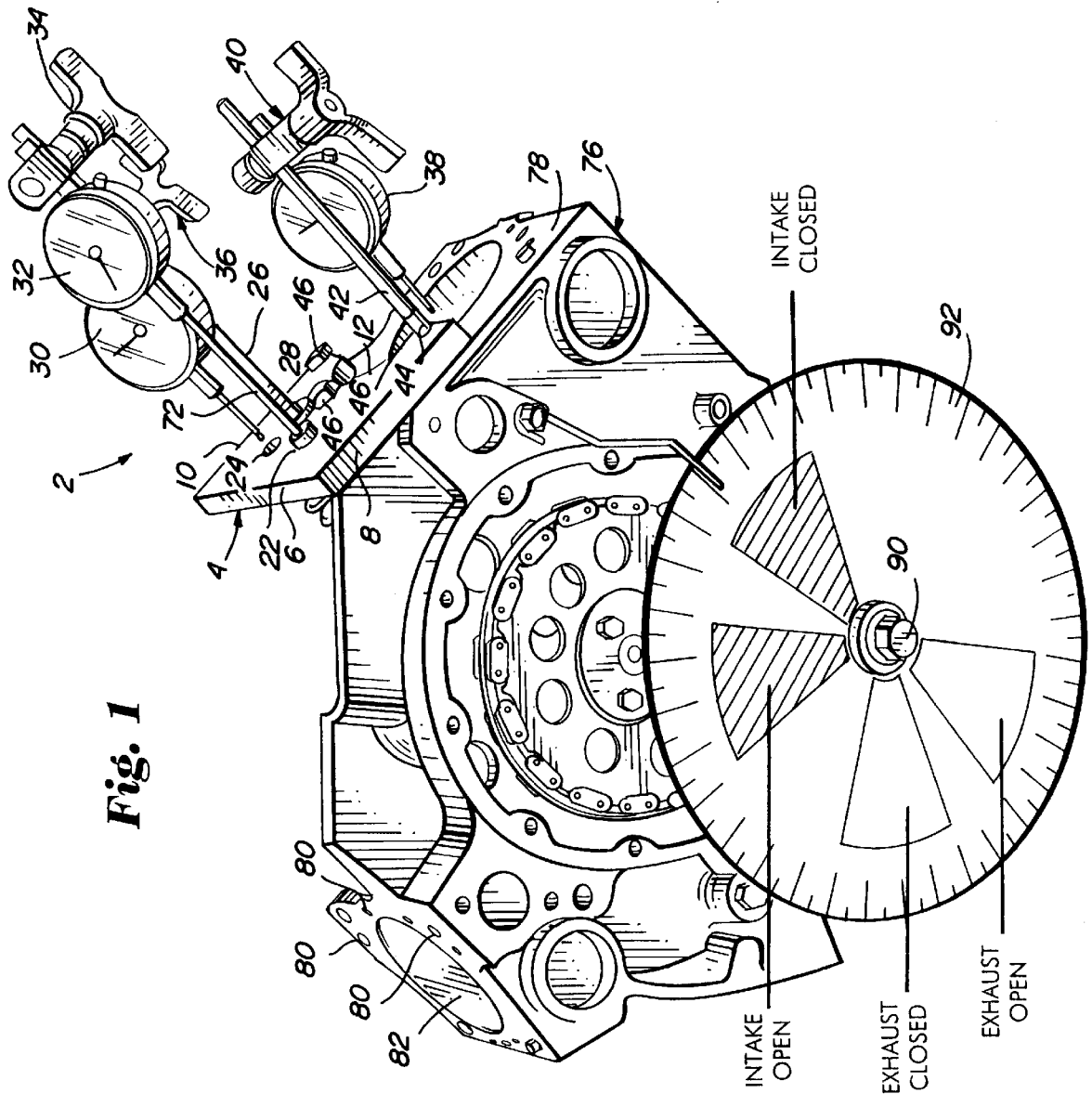
FIG. 1 is a front, top perspective view of the camshaft degreeing platform in accordance with this invention, mounted on a engine block (with the head removed) that has been cut behind the forward pair of cylinders.

Referring now to FIGS. 1–3 and 5, the measurement platform assembly is shown generally at 2 and includes a relatively thick plate 4, preferably formed of aluminum. The plate has a long straight side 6, a pair of ends 8, 10 and an arcuate cut out portion 12 (conforming to an engine cylinder arc) along the side opposite side 6. Side 6 defines a length dimension of about six inches while ends 8 and 10 define a width dimension of about 4 inches. The plate may have a thickness dimension of about 0.5 inch. It will be appreciated that these dimensions may change depending on engine size, layout, etc.

The plate 4 is provided with three smooth through holes 14, 16 and 18 which are sized and located so that threaded bolts may be used to firmly secure the plate to the engine block, using existing, threaded bolt holes in the head.

The plate 4 is provided with three additional holes 20, 22 and 24. Hole 20 is threaded and receives a threaded rod or standard 26, locked in place by a lock nut 28. Standard 26 serves as a support for a pair of conventional dial indicators 30, 32 using conventional, adjustable support brackets 34, 36, respectively.

A third dial indicator 38 is also supported by a conventional, adjustable mounting bracket 40 on a second vertical standard 42 welded to the head 44 of bolt 46, one of the three such bolts used to secure the plate 12 to the block.

The remaining holes 22, 24 are located so as to be aligned with the inlet and exhaust lifter holes in the engine block adjacent a respective cylinder and piston.

Figure 4:
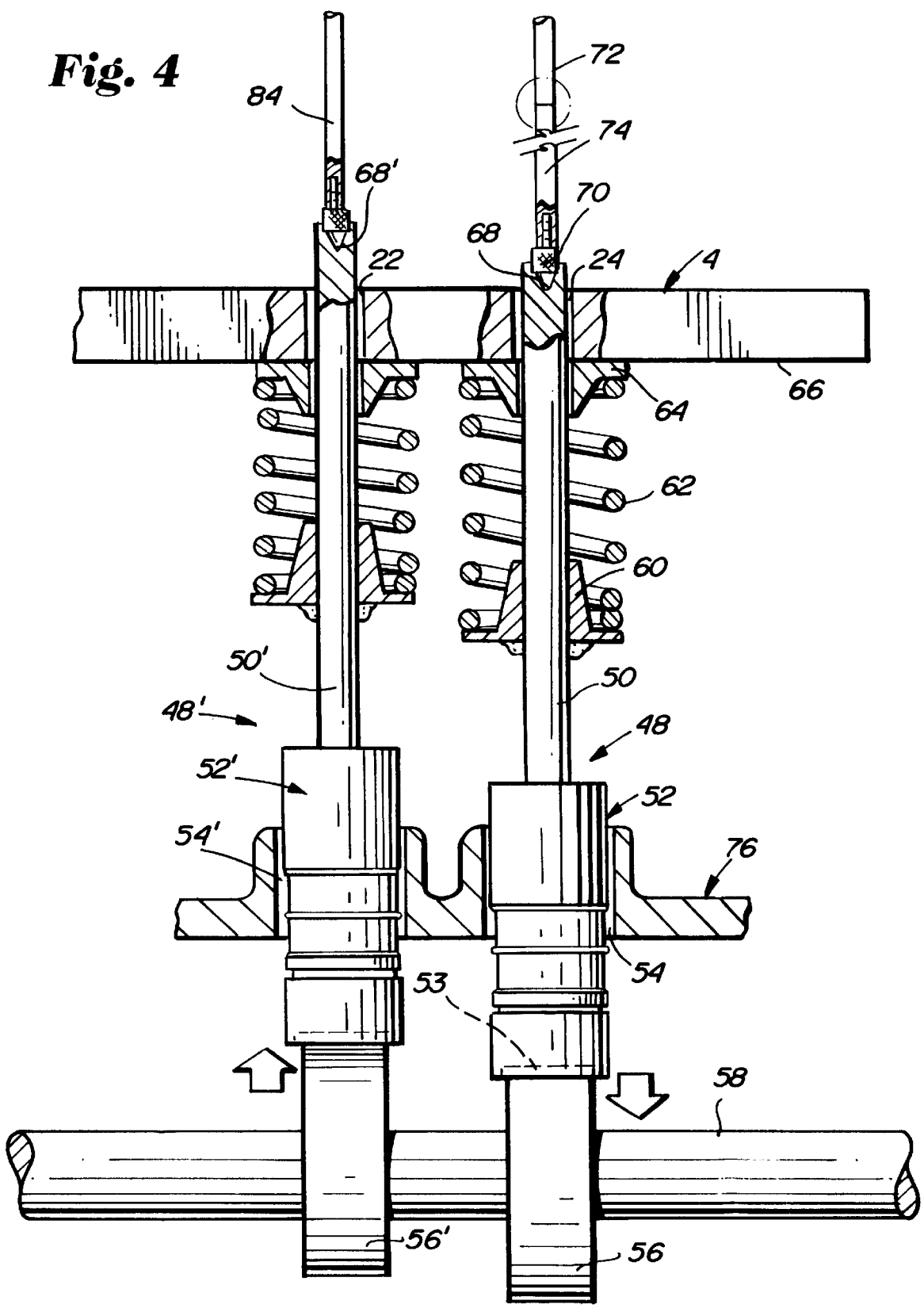
FIG. 4 is an enlarged detail, partly in section, illustrating the manner in which substitute lifters in accordance with the invention engage lobes of an engine camshaft at their lower ends, and dial indicator stems at their upper ends.
Figure 5:
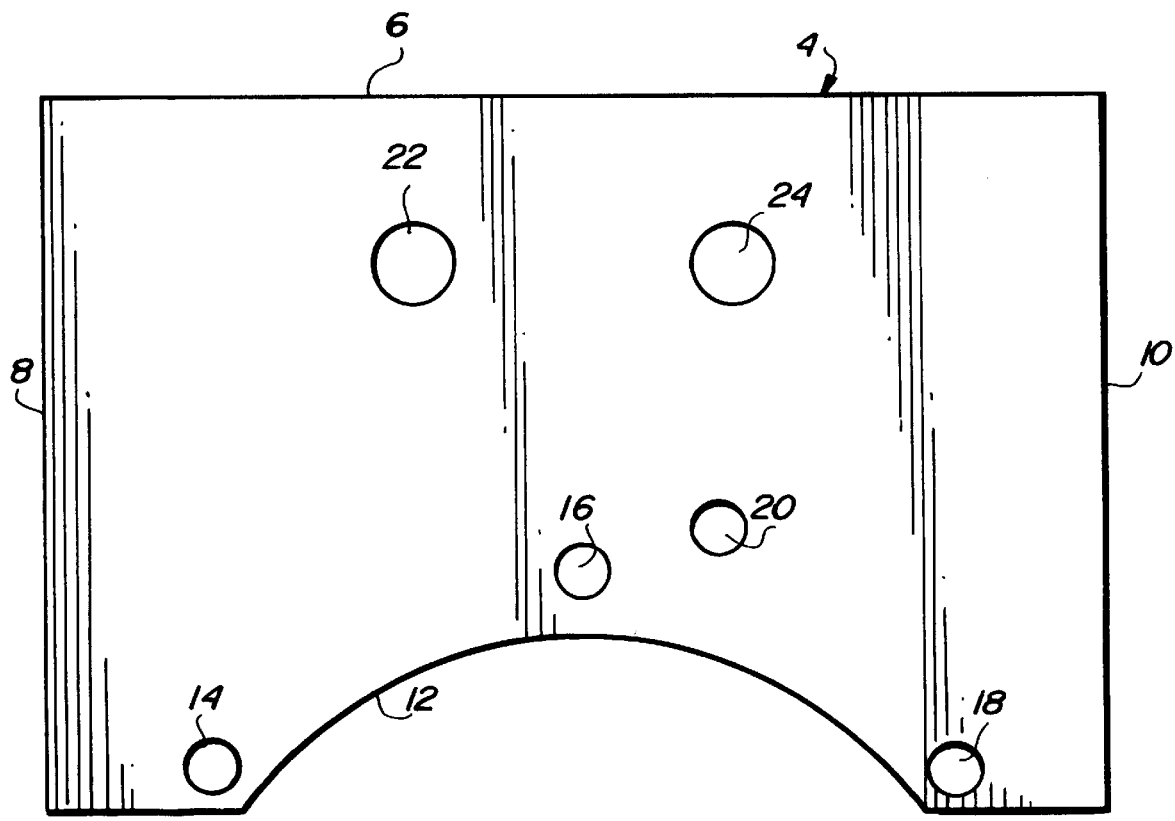
FIG. 5 is a plan view of the measurement platform in accordance with the invention, with standards and dial indicators omitted.

The device in accordance with this invention also includes a pair of identical lifter rod substitutes 48 and 48', only one of which need be described in detail. Specifically, as best seen in FIG. 4, the lifter rod substitute 48 includes a rod 50 welded to a dummy lifter 52. The latter may include a UHMW or like material "button" 53 recessed in its lower end where it engages the cam lobe so as to minimize any scuffing of the lobe. The lifter body has similar dimensions to a real lifter, and is thus sized to slide within the engine block bore 54. The lower end of the lifter body engages a cam lobe 56 of the camshaft 58, thus moving up and down as the camshaft rotates.

The rod 50 supports a centering washer or guide 60 which is welded thereto as best seen in FIG. 4. The washer 60 supports a coil spring 62 which is centered at its upper end by a second, loosely mounted washer 64. The washer 60 is located such that the lifter 48 is biased downwardly when the substitute lifter is interposed between the camshaft 58 and the lower side 66 of plate 4. This insures that the substitute lifter will descend within the bore 54 when the cam lobe rotates to its low side.

The upper end of rod 50 is formed with a conical recess 68 which is adapted to receive the lower end 70 of the stem 72 of dial indicator 32. In order to have both gauges 30, 32 mounted on the same standard 26, it may be necessary to add an extension 74 threaded to the stem 72 as best seen in FIGS. 4 and 4A.

Figure 2:
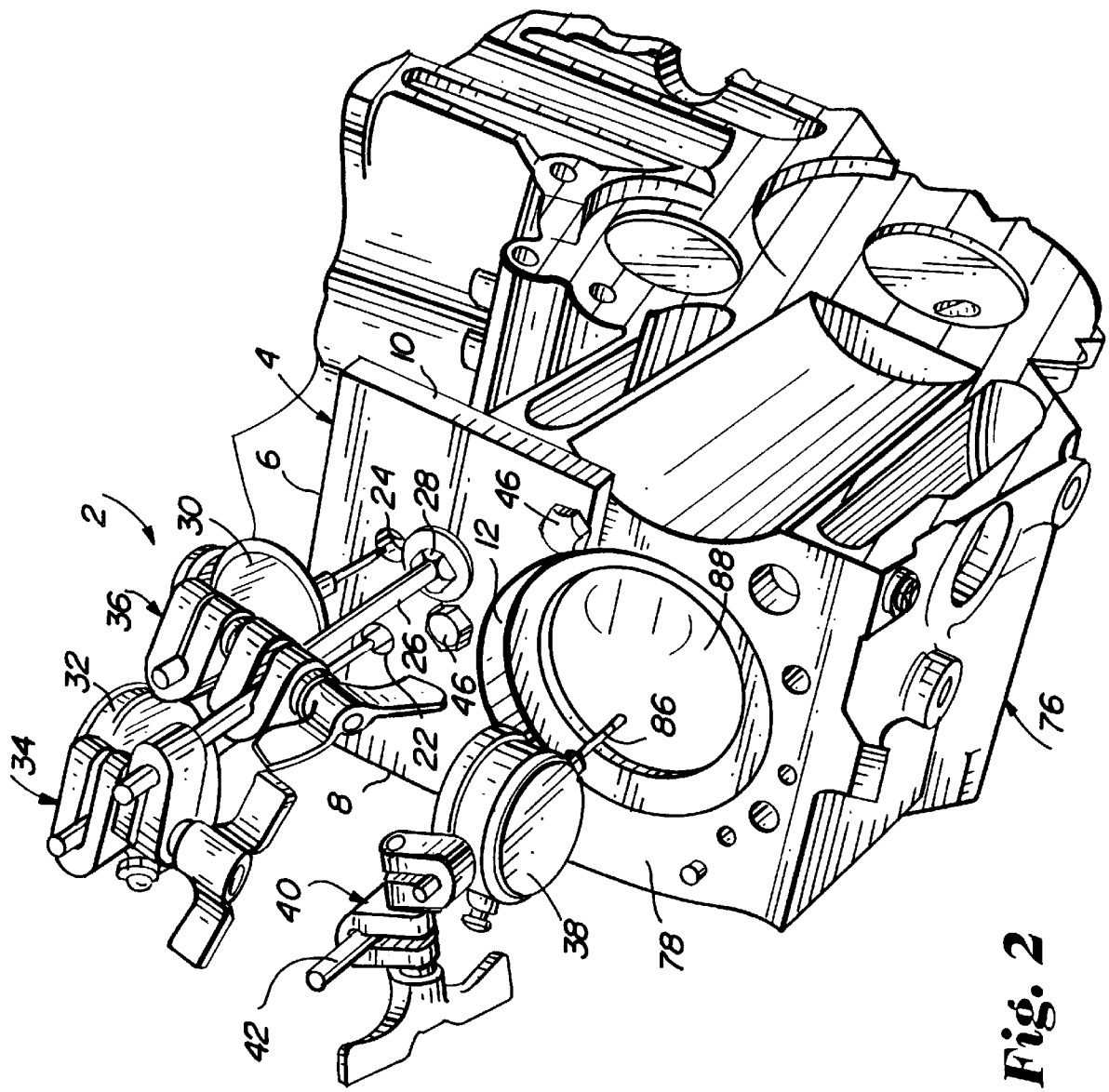
FIG. 2 illustrates the cam degreeing platform of FIG. 1, taken from a rear, top perspective.

In use, the plate 4 is secured to the head 76 of the engine as best seen in FIGS. 1 and 2. Bolts 46 are utilized to fasten the plate 4 to the block, using threaded bolt holes already formed in the block and used normally to secure the head (not shown) to the block along the surface 78. See, for example, similarly threaded head bolt holes 80 adjacent the cylinder 82 on the left side of the engine block as viewed in FIGS. 1 and 3. The lifter rod substitutes 48 and 48 are then located within the lifter gallery 84, with dummy lifters 52 and 52' located within the lifter bores 54 and 54' such that the respective dummy lifters 52 and 52' engage cam lobes 56 and 56'. The lifter substitutes are installed so that the upper ends of the rods 50 and 50' extend through the respective holes 24 and 22 in the plate 12. The indicators 30 and 32 are then located along the vertical standard 26, utilizing the adjustable brackets 34, 36 such that the spring loaded stems 74 and 84 are seated within the recesses 68 and 68' of the rods 50, 50', respectively. It should be noted here that washers may be welded or otherwise secured to the upper ends of rods 50 and 50', after insertion through the holes 22, 24 in order to retain the substitute lifters in a loosely assembled relationship with the platform 4. Dial indicator 38 is then located along the vertical standard 42 such that its stem 86 is located to engage the top of a piston 88 as it approaches top dead center and as it moves away from top dead center. If desired, the stem 86 may include an extension to enable measurement of the piston through its full range of travel.

With the dial indicators 30, 32 and 38 set up in the appropriate manner, the engine crank shaft can be rotated by means of a wrench (not shown) engaging the bolt head 90, best seen in FIG. 1. In order to carry out the camshaft degreeing procedure, an angle or degree plate 92 is typically secured by means of the bolt head 90 to the engine block for the purpose of illustrating and/or measuring the degrees of rotation of the camshaft. The plate 92 has degree markings about the full 360° periphery thereof, with further indicia delineating arcs through which noted valve motions occur. Such plates are per se known in the art.

As previously indicated, cam degreeing procedures are also well known, noting however, that the procedures may be carried out more quickly and more accurately with the measurement platform disclosed herein. Significantly, movement of the platform is minimized to the point where all measurement for a given cylinder are taken with the platform in a secure, stationary position. Relocation is required only to take measurements for a next cylinder and associated lifters, and this relocation is done quickly and easily simply by removing the bolts 46, relocating the assembly and reinstallation of the same bolts.

It will be appreciated that the invention is not limited to the specific mechanical measurement system described above. For example, the dial indicators may be replaced by electronic gauges and the degree wheel may be replaced by an electronic degree wheel kit containing an electromagnetic degree wheel and an electronic reader/counter. A control panel would also be included in this more advanced embodiment of the invention, so that the various measurements can be displayed on the control panel. An electronic gauge suitable for this application is a Mitutoyo electronic micrometer head Model No. 19705A63.

An even more advanced version of the application includes a microprocessor connected to the control panel which makes use of specially designed software that evaluates the data input and precisely pinpoints the cam degree. One suitable software system is sold under the name Meter Boss available from Teramar Group, Inc. of El Paso, Tex.

For the convenience of the user, it is anticipated that the measurement platform assembly of this invention will be provided in kit form, each of which will provide all of the components required to perform the cam degreeing procedure, depending on whether the mechanical, electronic or electronic/computer versions are selected.

A brief description of a typical procedure, utilizing the basic mechanical components of the invention follows below.

With a plate 4 and gauges 30, 32 and 38 in place, turn the crankshaft until the dial indicator gauge 38 indicates that TDC has been found. Adjust the degree wheel 92 to coincide with this reading of TDC. Preload the intake substitute valve lifter gauge about 0.010 (assume indicator 32 for purposes of this example). Rotate the crankshaft in normal direction of operation and observe the indicator, watching the point of maximum lift. Make a note of the degree wheel reading at this point of maximum lift. Rotate the crankshaft exactly one turn in the same direction until the pointer on the degree wheel again aligns with your previous notation. This position places the substitute lifter 48 in the midpoint of the clearance section of the cam lobe 56. The cam has now turned exactly 180°. The cam 58 will turn one revolution for every two crank revolutions. Without changing the indicator preload, set the dial indicator face to zero. Again rotate the crankshaft in the direction of the running rotation and observe the dial indicator. When it shows that the lifter substitute 48 has raised an amount equivalent to the checking clearance on the cam spec sheet, record the degree wheel reading. This will be a certain number of degrees BTDC. Continue to rotate the crankshaft in the same direction until the lifter substitute 48 has risen up in its bore and fallen back again as it followed the opening and closing flanks of the cam lobe. Watch again for the indicator to reach the checking clearance. Record the degree wheel reading as the number of degrees between the pointer and BDC. Finally, add 180° to the two previous degree wheel readings to get duration of opening measured at the checking clearance. Repeat this process several times to eliminate the possibility of errors. The user must then repeat this process with the exhaust valve lifter substitute 48', and then move to the next cylinder.

With the electronic version of the invention, the implementation is the same as described above, but all readings and measurements are displayed as digital read-outs on the control panel.

With the more advanced electronic/computer kit, the crankshaft is rotated until top dead center is accomplished, and the crankshaft is then further rotated two full revolutions. The computer in the control panel will then measure and record all readings throughout the procedure. A print-out will reveal these readings for physical location of the correct cam degree, or, alternatively, the operator can simply press a button the control panel and the computer will post the accurate cam degree on its digital read-out.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measurement platform assembly for degreeing a camshaft of an internal combustion engine having at least one piston reciprocable within a cylinder formed in a block, an intake valve and an exhaust valve and respective intake lifter and exhaust lifter associated with the cylinder and extending through respective intake and exhaust lifter bores in the block, the assembly comprising:

a plate having plural holes sized and arranged to permit fastening of the plate to the engine block via bolt holes in the block; said plate having one or more standards secured thereto; and at least two dial indicators mounted on said one or more standards, one of said dial indicators adapted to engage the piston and the other of said dial indicators adapted to be positioned over one of the intake and exhaust lifter bores; and a lifter rod substitute for the intake lifter and for the exhaust lifter, each lifter rod substitute including an extension rod which, in use, extends upwardly through said plate.

2. The assembly of claim 1 including two of said standards mounted on the plate, each having at least one of said at least two dial indicators mounted thereon, and wherein a third indicator is mounted on one of said two standards and is adapted to be positioned over the other of the intake and exhaust lifter bores.

3. The assembly of claim 1 wherein said lifter rod substitute further includes a spring seated on a flange provided on said extension rod, the spring extending between said flange and an underside of said plate to thereby bias the lifter rod substitute in a downward direction.

4. The assembly of claim 3 wherein an upper free end of said rod extension includes a recessed seat for receiving a tip of a respective dial indicator.

5. The assembly of claim 1 wherein each lifter rod substitute has a dummy lifter at a lower end thereof provided with means for minimizing scuffing of a camshaft lobe with which the dummy lifter is engaged.

6. The assembly of claim 1 wherein said plate comprises aluminum.

7. A measurement platform assembly for degreeing a camshaft of an internal combustion engine having at least one piston reciprocable within a cylinder formed in a block, an intake valve and an exhaust valve and respective intake lifter and exhaust lifter associated with the cylinder and extending through respective intake and exhaust lifter bores in the block, the assembly comprising:

substitute intake and exhaust lifters for replacing the intake lifter and exhaust lifter;

a plate having plural holes sized and arranged to permit fastening of the plate to the engine block via bolt holes in the block; said plate mounting three gauges, one of which is adapted to engage the piston and two of which are adapted to engage the respective substitute intake and exhaust lifters, said gauges adapted to measure movement of the piston and substitute intake and exhaust lifters as the camshaft rotates.

8. The assembly of claim 7 wherein said gauges are mechanical dial indicators.

9. The assembly of claim 7 wherein said gauges are electronic micrometers.

10. The assembly of claim 9 and including computer means connected to said gauges for measuring, recording and displaying readings from said gauges.

11. The assembly of claim 7 wherein each substitute intake and exhaust lifter includes a dummy lifter fixed to a lower end of an extension rod, wherein, in use, said dummy lifter engages the camshaft and the extension rod extends upwardly through said plate.

12. A measurement platform assembly for degreeing a camshaft of an internal combustion engine having at least one piston reciprocable within a cylinder formed in a block, an intake valve and an exhaust valve and respective intake lifter and exhaust lifter associated with the cylinder and extending through respective intake and exhaust lifter bores in the block, the assembly comprising:

a plate having plural holes sized and arranged to permit fastening of the plate to the engine block via bolt holes in the block; said plate having one or more standards secured thereto; and at least two electronic gauges mounted on said one or more standards, one of said gauges adapted to engage and measure movement of the piston and the other of said gauges adapted to be positioned over one of the intake and exhaust lifter bores for engagement with an extension rod located in said one of said intake and exhaust lifter bores; and including computer means connected to said gauges for measuring, recording and displaying readings from said gauges.

* * * * *